US008708693B2

(12) United States Patent
Astesiano et al.

(10) Patent No.: US 8,708,693 B2
(45) Date of Patent: Apr. 29, 2014

(54) INDUSTRIAL BURNER AND RELATED COMBUSTION PROCESS FOR HEAT TREATMENT FURNACES

(75) Inventors: Davide Astesiano, Genoa (IT); Alessandro Donetti, Genoa (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 11 days.

(21) Appl. No.: 13/261,302

(22) PCT Filed: Dec. 1, 2010

(86) PCT No.: PCT/IB2010/055525
§ 371 (c)(1),
(2), (4) Date: May 31, 2012

(87) PCT Pub. No.: WO2011/067722
PCT Pub. Date: Jun. 9, 2011

(65) Prior Publication Data

US 2012/0315584 A1 Dec. 13, 2012

(30) Foreign Application Priority Data

Dec. 1, 2009 (IT) .............................. MI2009A2116

(51) Int. Cl.
*F23D 14/12* (2006.01)

(52) U.S. Cl.
USPC .................. 431/8; 431/2; 431/328; 431/352; 431/353

(58) Field of Classification Search
USPC .............. 126/2, 8, 10, 12, 328, 352, 353, 354
See application file for complete search history.

(56) References Cited

U.S. PATENT DOCUMENTS 5,055,032 A 10/1991 Altemark et al.

FOREIGN PATENT DOCUMENTS

| | | |
|---|---|---|
| DE | 10037841 | 2/2002 |
| EP | 0809072 | 11/1997 |
| WO | WO9614540 | 5/1996 |
| WO | WO2006133880 | 12/2006 |
| WO | WO2008023011 | 2/2008 |
| WO | WO2009047260 | 4/2009 |

*Primary Examiner* — Alfred Basichas

(74) *Attorney, Agent, or Firm* — Stetina Brunda Garred & Brucker

(57) ABSTRACT

A high speed burner having very low polluting emissions, suitable for the process for heat treatment furnaces of a load in free atmosphere. The burner is capable of creating a compact and lean flame with the peculiarity of keeping the NOx emissions at very low levels at any chamber temperature and at any excess combustion air. The burner requires a single inlet for the comburent air and a single inlet for the combustible gas.

14 Claims, 9 Drawing Sheets

1
2
5
6
7
7'
10
11
12
13
14
15
16
20
25
26
27
28
X

X
15
24
7
7
23
7
7
22
22
5

12
13
14
16

A
Y
5
21
16'
25
13
19
17
18
N'
15
20
21
M'
18
17
25
7'
7
19
12'
21
A

INDUSTRIAL BURNER AND RELATED COMBUSTION PROCESS FOR HEAT TREATMENT FURNACES

FIELD OF THE INVENTION

The present invention relates to a high speed burner with lean and compact flame capable of obtaining very low NOx emissions while keeping the flame stable at any chamber temperature. The burner implements combustion techniques such as dividing the main combustion into three stages (air and fuel staging), recirculating flue gases and further diluting some reagents.

STATE OF THE ART

Over the last years, the market demand concerning a reduction in gas consumption has forced industrial furnace manufacturers to develop their products by taking advantage of the heat of the combustion flue gases for heating the combustion air by means of exchangers. Therefore, the need has been created to develop burners which operate with comburent air pre-heated at a temperature of about 400-550° C. At the same time, the laws on nitrogen monoxide and dioxide emissions have established increasingly restrictive limitations and have forced manufacturers to make burners capable of falling within the limitations set.

However, it is known that the formation of the NOx also increases according to the temperature of the combustion air. The higher the temperature of the air, the more the temperature of the flame increases thus generating the formation of thermal NOx. To keep the emissions low, low NOx burners use techniques for decreasing the temperature of the flame such as flame staging, flue gas dilution and flameless combustion.

The burners which use the air staging technique operate by injecting the air into two different zones at various distances from the burner and create two combustions, one with sub-stoichiometric ratio and the other with super-stoichiometric ratio and which completes the main combustion.

Instead, the fuel staging operates by injecting the gas into two different zones at various distance from the burner thus generating two combustions with super- and sub-stoichiometric ratios. The object of both the techniques is the one of decreasing the flame temperature when the percentage of oxygen is high in combustion.

However, the drawback of the burners which use these techniques is the cold instability, i.e. below the spontaneous ignition temperature as the two combustions are fed by unbalanced reagents, one with air in excess and the other with gas in excess. The way to cold stabilize the flame is to increase the excess air of the main combustion so as the primary combustion does not have gas in excess with the consequent increase of the NOx (there is no more sub-stoichiometric combustion) and the consumption of gas. Once the temperature of spontaneous ignition of the fuel in the chamber is exceeded, the burner no longer requires the excess air and operates in stoichiometric ratio with low NOx emissions.

The burners which use flameless combustion have significantly low NOx emissions but have the significant limitation of not being able to operate in flameless mode below the temperature of spontaneous ignition of the fuel. Therefore, even to heat the chamber with the same burner, these burners should be able to operate in traditional mode (non-flameless), and consequently are to be equipped with some valves for modulating the gas or the air inlet according to the type of operation.

The burners which operate with the mentioned combustion techniques have significant advantages when the chamber temperature is high but have significant limitations when the temperature is below or about the temperature of spontaneous ignition of the fuel.

In specific types of process, such as in furnaces for heat treatments of the load, the zone temperatures are relatively low and vary significantly according to the type of treatment. Under these conditions, the burners with staged combustion and the burners with flameless combustion are not capable of operating constantly in low NOx mode but should vary their excess air or the operating mode (flameless—non flameless) according to the chamber temperature, respectively. The result is that the zone adjustment valves and the valves which control the injection of the fuel (for flameless burners) operate continuously during the operation of the furnace.

Heat treatment furnaces heat the load in free atmosphere by convection by means of the high speed of the flue gases which sweep it and not by means of radiation as occurs for reheating furnaces. Thus, there is a need in this type of application for burners which are capable of developing a high speed, lean and compact flame and not a diffused flame or with voluminous combustion.

Thus, the need is felt to make a burner and a related combustion process which allows the aforesaid drawbacks to be overcome.

SUMMARY OF THE INVENTION

It is the primary object of the present invention to make a burner which allows very low NOx emissions to be obtained both in the ignition phase, that is cold, and in the operation at speed thereof and which is also capable of obtaining a combustion compatible with the process of the heat treatment furnaces of the load in free atmosphere.

It is another object of the invention to obtain a related combustion process for heat treatment furnaces in free atmosphere which always allows very low NOx emissions to be obtained.

Thus, the present invention proposes to achieve the above-discussed objects by making a low NOx emission industrial burner which, according to claim 1, comprises:

- a hollow body defining a longitudinal axis X;
- a tubular element arranged within said hollow body at one open end thereof;
- a diffuser arranged within said tubular element at a first end thereof inside the hollow body, so as to define a volume within said hollow body;
- a pipe for feeding comburent air into said volume;
- a combustible gas injection lance, arranged within said hollow body and connected to said diffuser;

in which said diffuser is provided with

- first holes for injecting a first portion of combustible gas from said injection lance, into a first combustion zone provided within said tubular element and adjacent to said diffuser;
- second holes for injecting a first portion of comburent air into said first combustion zone;
- third holes for injecting a second portion of comburent air into a second combustion zone, provided inside said tubular element, downstream of the first combustion zone and communicating with the latter, said second portion of comburent air crossing said first combustion zone;
- a tube for injecting a second portion of combustible gas, from said injection lance, into a third combustion zone outside said tubular element, provided downstream of the second combustion zone and communicating with the latter, said second portion of combustible gas crossing said second combustion zone; the burner being also provided with a longitudinal passage, defined between the outer profile of said tubular element and the inner profile of said open end of the hollow body, for injecting a third portion of comburent air into said third combustion zone.

A second aspect of the present invention provides a low NOx emission combustion process, obtainable by means of the aforesaid burner and a furnace with which said burner cooperates by defining a combustion chamber, the process sequentially comprising the following combustion steps, according to claim 11:

- a primary combustion which occurs by mixing, in the first combustion zone, a first portion of comburent air injected through the second holes with a first portion of combustible gas injected through the first holes in a first, in essence stoichiometric air/fuel ratio $\lambda_1$, thus obtaining primary combustion products and primary unburnt gas;
- a secondary combustion which occurs by mixing, in the second combustion zone, a second portion of comburent air injected through the third holes with said primary combustion products and said primary unburnt gas with air in excess, so as to obtain a second super-stoichiometric air/fuel ratio $\lambda_2$, thus obtaining secondary combustion products and secondary unburnt air;
- a tertiary combustion which occurs by mixing, in the third combustion zone, a second portion of combustible gas injected through the tube with a third portion of comburent air injected through the longitudinal passage, with said primary and secondary combustion products and said secondary unburnt air with gas in excess, so as to obtain a third sub-stoichiometric air/fuel ratio $\lambda_3$, such as to complete the total combustion within the combustion chamber of the furnace.

The low NOx emission burner object of the present invention advantageously generates a high speed and compact flame and bases its principles on the staged combustion of air and gas. The combustion technique used is called "fuel staging" combined with recirculating flue gases and diluting the flame.

The combustion air or comburent air and the combustible gas are injected into different zones of the combustion chamber through a combustion head or diffuser so as to obtain various combustions in which the combination is controlled and restricted of the high percentage of oxygen in the combustion and the high flame temperature, caused by the generation of the NOx of thermal origin.

Advantageously, the burner provides three main combustions in series, called primary combustion, secondary combustion and tertiary combustion, respectively. These three main combustions are carried out at respective different distances from the combustion head and with respective different combustion ratios: the primary combustion provides a combustion ratio (air/fuel) near the stoichiometric; the secondary combustion is achieved by means of a combustion ratio with significant air in excess so as to achieve a super-stoichiometric air/fuel ratio; the tertiary combustion has a combustion ratio with gas in excess so as to achieve a sub-stoichiometric air/fuel ratio such as to complete the total combustion.

Furthermore, the burner of the invention provides that the primary combustion is broken down into primary sub-combustions in which the combustion ratio is kept constant but for which the primary combustible gas and the primary comburent air are injected and mixed at different distances from the combustion head. Thereby, although the combustion ratio is kept unaltered, the flame is further diluted with particularly advantageous effects for reducing the formation of the NOx.

Due to the geometry of the combustion head or diffuser and to the configuration of the holes for injecting the secondary air (partially comburent in the secondary combustion and partially in the tertiary combustion) and the tertiary air (comburent in the tertiary combustion) the flame generated by the burner is particularly lean and compact. The holes of the secondary air are advantageously configured so as to create a "swirled" and compact flame.

A particular advantage for the type of process to be achieved is that the burner does not require differentiating the combustion technique according to the temperature of the combustion chamber to reduce the NOx emissions. Indeed, the burner is made to operate at temperatures about the temperature of spontaneous ignition of the fuel, hence it is impossible to use combustion techniques which have as their main prerogative a chamber temperature always higher than the one of spontaneous ignition of the combustible (flameless combustion). Advantageously, for the same reason the burner of the invention does not require a double inlet for the comburent air or for the combustible gas.

Moreover, as is known, most flameless burners on the market require a higher pressure of the combustible gas with respect to the one of traditional burners while the burner of the invention succeeds in obtaining excellent performances with the same air and gas pressures of a traditional burner.

The fuel and the combustion air are injected into the combustion chamber at such a speed whereby a high recirculation of the burnt gases is obtained. In particular, the speed of the tertiary air and of the secondary gas (fuel in the tertiary combustion) are crucial for obtaining a strong mixing with the burnt gases and consequently decreasing the percentage of oxygen in the combustion.

The main innovation of the burner of the invention concerns the fact that by simultaneously using the "fuel staging", heavily diluting the flame and recirculating the flue gases, the NOx emission are always very low at any chamber temperature and the burner succeeds in entering an operating range in which the flameless combustion is automatically generated.

Advantageously, the burner of the invention, conceived for heat treatment furnaces of load in free atmosphere may operate both with significant air in excess and in stoichiometric ratio regardless of the chamber temperature.

In particular, when the chamber temperature is above 800° C., by decreasing the excess air up to $\lambda<1.1$, the burner automatically enters an operating range in which the recirculation of the flue gases (Kv=4) and the low percentage of oxygen in the combustion is such as to make the combustion with invisible flame (FIG. 6).

It is preferable to control the burner in on/off mode to constantly have a high recirculating factor of the flue gases Kv, and accordingly to keep the air and gas injection speeds high; i.e. operate the burner according to the power requirement of the heating of the furnace, at maximum power or by keeping it off. In any event, the burner is also capable of operating correctly when it is proportionately controlled by increasing or decreasing the power according to the process requirement.

Considering that the burner of the invention operates in a range of temperatures spanning the temperature of spontaneous ignition of the fuel and with a control in on/off mode, it is provided with ignition and flame detection instruments to permit the execution of the ignition and the shutdown cycles in complete safety. In particular, the combustion head is prepared with two holes for accommodating an ignition device, such as an ignition electrode or pilot burner, and a flame detection device, such as a UV cell or a flame detection electrode, respectively.

Considering the importance of the stability of the burner upon ignition and when the flame is triggered, by means of the ignition device, the primary combustion has a combustion ratio such that the flame has a very anchored root and has a particularly strong emission spectrum, to be detected by the flame detection device at any chamber temperature, and not very sensitive to the variation of the combustion ratio.

Advantageously, the burner of the invention does not require significant excess air (with combustion ratio $\lambda>1.5$), at chamber temperatures below the one of spontaneous ignition of the fuel, as occurs for most burners which use staged combustion, but right from the cold ignition is capable of operating with a combustion ratio close to the stoichiometric ratio, thus keeping the NOx emissions low and those of CO extremely low.

Summarizing, the very low NOx emission burner with compact, lean and high speed flame object of the present invention succeeds in cold operating without requiring significant excess air, keeps both cold and hot emissions very low without having the need to change the type of combustion technique (from non flameless to flameless) and has a good flame stability for any chamber temperature and for any combustion ratio. The flame generated is not diffused but is fast, lean, compact and transparent and is particularly suitable for applications which require a large contribution for heating the material due to the convection promoted in the furnace by means of the high speeds of the flue gases.

Further, the flexibility of the burner is given by the opportunity of operating with combustion ratios where $\lambda=Ar/At$ variable from 0.9 to 2 according to the type of heating required, where Ar is the ratio between the true air output and the fuel flow rate and At is the ratio between the theoretical air output and fuel flow rate. Lastly, the burner of the invention is very compact and is provided with a single inlet for the comburent air and a single inlet for the fuel.

The dependent claims describe preferred embodiments of the invention.

BRIEF DESCRIPTION OF THE FIGURES

Further features and advantages of the invention will be more apparent in light of the detailed description of a preferred, but not exclusive, embodiment of a burner, shown by way of non-limiting example, with the aid of the accompanying drawings in which.

DETAILED DESCRIPTION OF A PREFERRED EMBODIMENT OF THE INVENTION

With reference to the figures, a preferred embodiment is shown of a burner, globally indicated by numeral 1, adapted to achieve a very low NOx emission combustion with high speed flame by using the simultaneous combination of the techniques of "fuel staging", recirculating flue gases and diluting the flame.

Figure 4:
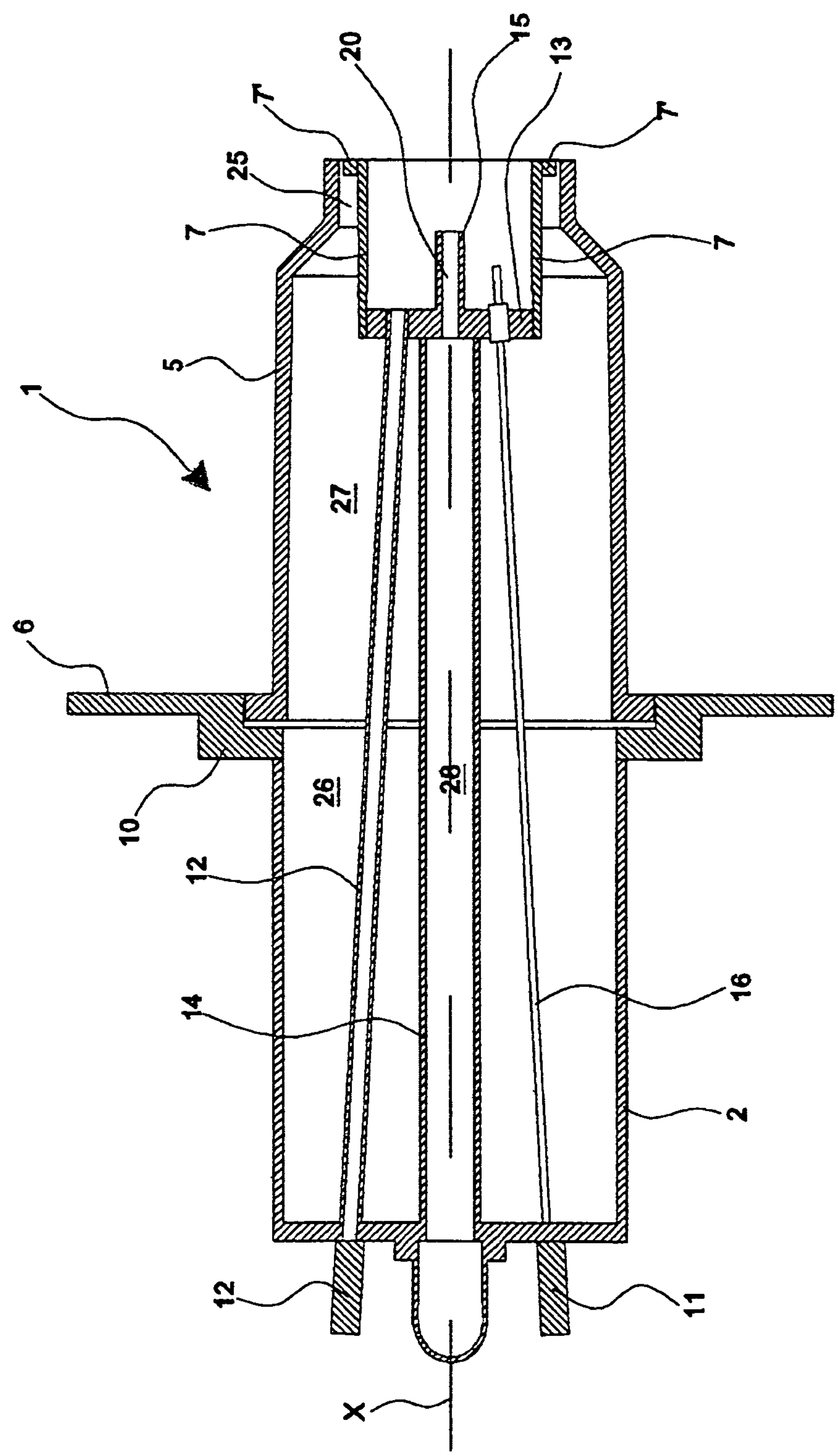
FIG. 4 shows a diagrammatic cross-sectional top view of the burner in FIG. 1.
Figure 5:
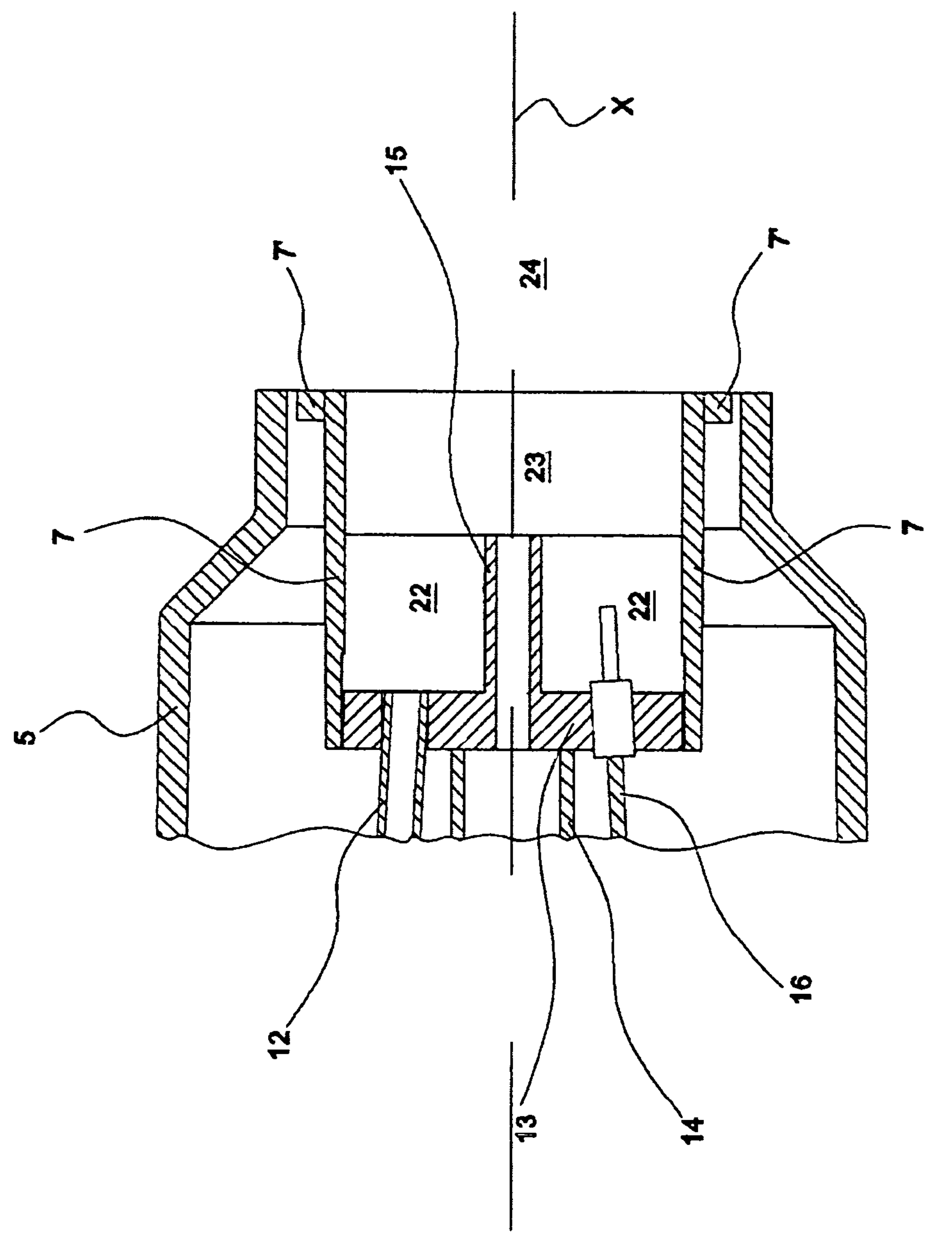
FIG. 5 shows a section along the path plane A-A of the burner in FIG. 3.
Figure 6:
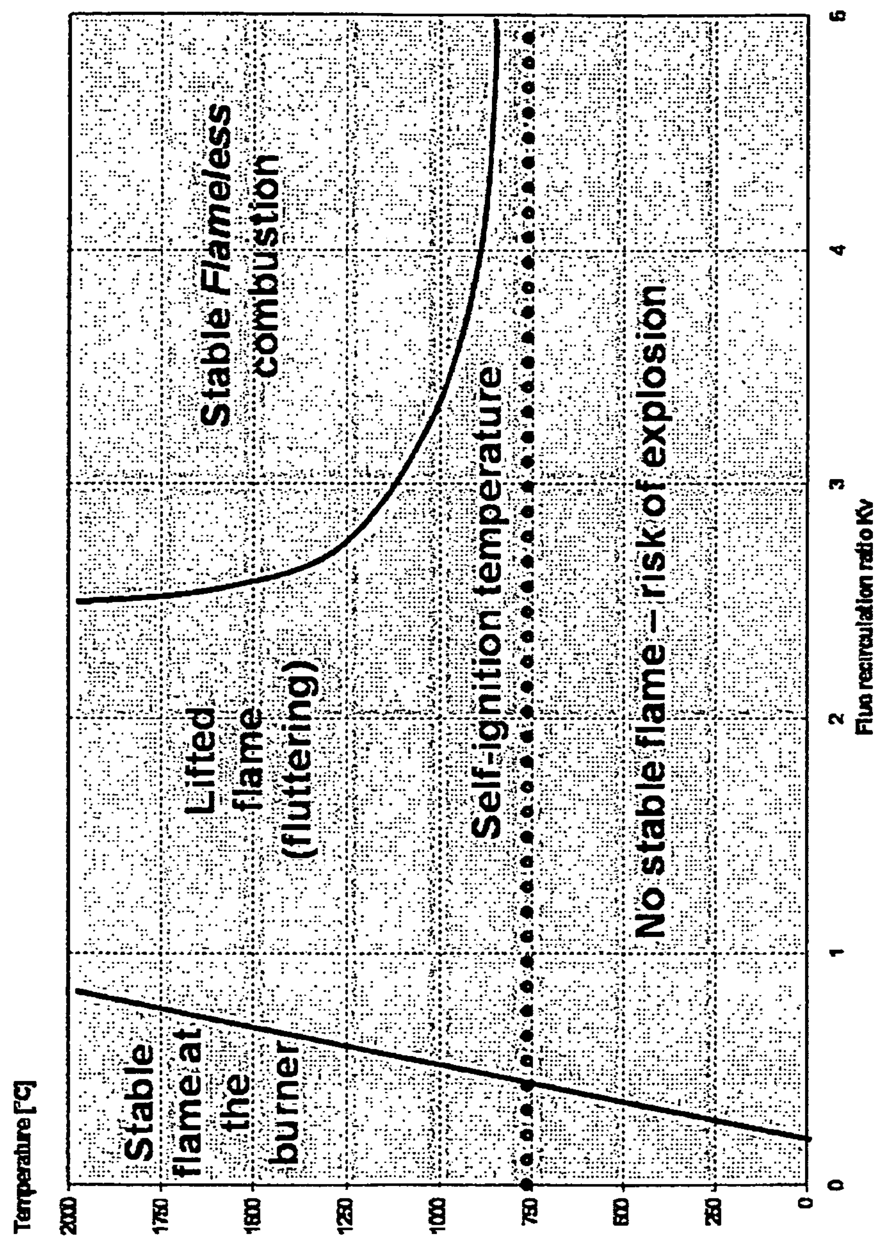
FIG. 6 shows a temperature-recirculating factor diagram of the flue gases Kv in which zones are identified with different flame configuration.

The burner 1, object of the present invention, defines a longitudinal axis X and comprises:

- a main metal holly body, in essence of cylindrical shape, comprising a first longitudinal hollow element 2 connected to and communicating with a second longitudinal tubular element 5 or flame guide tube;
- a pipe for feeding the comburent air 3;
- a pipe for feeding the combustible gas 4;
- a connection flange 6 of the burner to the furnace armour plate;
- a connection flange 10 of the first longitudinal hollow element 2 on the connection flange 6;
- a cylindrical tubular element 7, preferably made with silicon carbide or other suitable material, accommodated within the flame guide tube 5 at the front end thereof (FIGS. 4 and 5);
- a combustion head or diffuser 13, in essence of flat and round shape, for passing the combustible gas and the comburent air into the combustion chamber of the furnace, said diffuser 13 being accommodated within said cylindrical tubular element 7 so as in essence to define a cup whose bottom is the diffuser 13 (FIG. 5);
- a feeding lance 14 for the combustible gas;
- a housing for the ignition device 11 with electrode 16 or pilot burner, obtained in the first longitudinal hollow element 2;
- a guide tube 12 for accommodating a flame detection device.

The pipe for feeding the comburent air 3 is connected with the tubes of the feeding system by means of the flange 8 which may have, for example, circular or square shape. The air passing through the pipe 3 passes through the volume 26 within the hollow element 2 of cylindrical shape and through the volume 27 within the flame guide tube 5, before being injected into the combustion chamber.

The combustion head or diffuser 13, for example of flat cylindrical shape, is equipped with holes 18 for passing a first portion of comburent air, called primary air, and holes 19 for passing a second portion of comburent air, called secondary air, into the chamber of the furnace.

The diffuser 13, preferably but not necessarily made with metal material, is also equipped with holes 17 for passing a first portion of combustible gas, called primary gas, and with a central hole for passing a tube 15 for injecting a second portion of combustible gas, called secondary gas, into the chamber of the furnace. Both the holes 17 and the tube 15 are communicating with the feeding lance 14. In the preferred variant in FIGS. 4 and 5, the tube 15 is integrally provided with the diffuser 13.

Lastly, the diffuser 13 is provided with a further hole 16' for accommodating the ignition device with electrode 16 or with pilot, and with a further hole 12' for accommodating the flame detection device with electrode or with UV cell which crosses the tube 12.

At said front end, the flame guide tube 5 has a narrowing section thereof (FIG. 4) whereby a circular-crown-shaped passage 25 is defined between tubular element 7 and tube 5 for injecting a third portion of comburent air, called tertiary air, into the chamber of the furnace. Said tertiary air also leaks out of further holes 21 obtained on an edge 7' of the cup, that is on an annular protrusion of the tubular element 7 at the front end thereof. The circular-crown-shaped passage 25 should have an appropriate minimum section at the edge 7' to promote the recirculation of the flue gases determined by the tertiary air exiting from the holes 21.

As explained in detail below, the combustion head or diffuser 13 directs comburent air into two different zones 22 and 23 of the combustion chamber, both said zones 22 and 23 being within the so-called cup (FIG. 5); while the tubular element 7 and flame guide tube 5 direct comburent air into a third zone 24 in the combustion chamber, downstream of the zones 22 and 23.

The rear wall of the hollow cylindrical element 2 is holed for passing the feeding lance 14 of the combustible gas and for the housings of the ignition device 11 and of the flame detection device.

The pipe for feeding the combustible gas 4 puts the feeding system and the fuel lance 14 in communication through the flange 9. As explained in detail below, the combustible gas is directed into the combustion chamber through the combustion head 13 into the zone 22 and through the tube 15 into the zones 23 and 24.

The essential parts of the burner which determine the correct operation of the combustion process are the flame guide tube 5, the combustion head 13 and the tubular element 7.

The flame guide tube 5 serves the function of directing a part of the combustion air passing through the volume 27, through the combustion head 13 and the other part through the circular crown 25 delimited by the flame guide tube 5 and by the tubular element 7.

The combustion head 13 is fundamental for directing the air and the fuel into the combustion chamber at various distances, speeds and angles.

The sizes of the tubular element 7 determine the speed of the flame generated in the primary and secondary combustion and determine the outlet speed of the tertiary air.

Advantageously, the division of comburent air and of the combustible gas is performed by means of calculating the losses of load and the sizing of the holes 17, 18, 19 of the combustion head 13, the passage section 20 of the tube 15, the circular-crown-shaped passage 25 between tubular element 7 and flame guide tube 5, and the holes 21 of the annular protrusion 7'. Thus, there is no need for various air and gas inlets to perform the separation or related adjustment valves or additional blocking valves on the feeding lines.

As already described, the comburent air passes through different series of holes provided on the combustion head or diffuser 13; the primary air is injected into the chamber through the holes 18 while the secondary air is injected through the holes 19. A last part of comburent air, the tertiary air, is deviated by the tubular element 7 towards the outside of the burner and injected into the chamber through the circular-crown-shaped passage 25 and through the holes 21 on the edge or annular protrusion 7' of the tubular element 7.

The combustible gas passes in the volume 28 within the gas lance 14 and is injected into the combustion chamber through the combustion head 13 and the tube 15. In particular, a first part of gas, called primary gas, is injected by means of the holes 17 of the combustion head 13 while a second part of gas, called secondary gas, is injected by means of the tube 15 passing through said combustion head 13.

Advantageously, the comburent air and the combustible gas are mixed in three various main zones and develop three combustions in series characterized by three various combustion ratios so that the flame is stable thus preventing the combination of the high percentage of oxygen and the high flame temperature. This solution reduces the NOx polluting emissions, also due to the significant recirculation of the combustion flue gases.

The primary air exiting from the holes 18, adequately sized and inclined with respect to the longitudinal axis X of the burner, is directed at a predetermined distance from the combustion head 13 at the primary zone 22. The number of holes 18 is preferably between four and eight. Eight holes 18 are provided in the two variants in FIG. 3 and FIG. 7.

The primary combustible gas exiting from the holes 17, adequately sized and inclined with respect to the longitudinal axis X of the burner, is directed at a predetermined distance from the combustion head 13 at the primary zone 22. The number of holes 17 is between two and four. Four holes 17 are provided in the two variants in FIG. 3 and FIG. 7.

The primary combustion occurs by mixing, within the primary zone 22, primary comburent air and primary combustible gas substantially at stoichiometric ratio and obtaining primary combustion products and unburnt gas.

Preferably, to obtain a further dilution of the flame and a significant reduction of the NOx, the inclination of part of the holes 18 is differentiated with respect to the remaining holes 18 for injecting the primary air into at least two various sub-zones of primary combustion within the said primary zone 22. Similarly, the inclination of part of the holes 17 is differentiated with respect to the remaining holes 17 for injecting the primary combustible gas into at least two various sub-zones of primary combustion within the same primary zone 22.

Thus, within the primary combustion, it is possible—according to the inclination, number and positioning of the holes 17 and 18—to have a number of primary sub-combustions between two and four, the root of each sub-combustion being at a different distance from the combustion head 13 with respect to the other sub-combustions.

The primary sub-combustions deriving from the various inclination of the holes 18 and 17 have the same combustion ratio and are only differentiated by the various distance from the head 13 from which they originate. The combustion ratio is such as to determine good flame stability of the burner, the correct ignition and the flame detection. Advantageously, by having a primary combustion substantially in stoichiometric ratio, the burner is stable, the flame is anchored and the flame detection signal is high.

The secondary air is injected at a predetermined speed into the combustion chamber through the holes 19, passes through the primary zone 22 and reaches the secondary zone 23 where it is involved in the secondary combustion. The holes 19 have such an angle whereby the shape of the flame exiting from the flame guide tube 5 is compact and lean, and are preferably swirled, i.e. vortical, to have the flame of decreased length and further compacted. The secondary combustion occurs by mixing, in the secondary zone 23, only a first portion of said secondary air with the combustion products deriving from the primary combustion and with the unburnt gas also from the primary combustion. The secondary combustion advantageously has a combustion ratio characterized by significant excess air.

The primary and secondary combustions both originated within the tubular element 7, in zones 22 and 23, respectively, and thus the sizing of the tubular element 7 is an important factor for determining the flame propagation speed, preferably between 30 and 40 m/s. Advantageously, the ratio between the length of the tubular element 7 and the inner diameter of the tubular element 7 comprises the values in the range from 0.95 to 1.05.

Lastly, the tertiary air is injected at a predetermined speed into the combustion chamber through the circular-crown-shaped passage 25, provided between the flame guide tube 5 and the tubular element 7, and through the holes 21 of the annular protrusion 7' of the tubular element 7 in the so-called tertiary zone 24, downstream of the secondary zone 23, where it is involved in the tertiary combustion.

The secondary combustible gas is injected at a predetermined speed into the combustion chamber through the tube 15, crosses the secondary zone 23 and reaches the tertiary zone 24 where it is involved in the tertiary combustion.

The tertiary combustion occurs by mixing, in the tertiary zone 24, all the secondary gas exiting from the tube 15 with the combustion products deriving from the primary and secondary combustions, with the second portion of the secondary air exiting from the holes 19, that is with the unburnt air from the secondary combustion, and with all the tertiary air so as to have significant gas in excess. The tertiary air permits to complete the total combustion within the combustion chamber.

Advantageously, the injection speeds of the tertiary air and of the secondary gas and the geometry of the holes 21 are such as to create whirls capable of swallowing up the burnt gases of the chamber (that is create the so-called recirculation of flue gases) and decreasing the percentage of oxygen in the combustion, and consequently reducing the NOx.

Advantageously, the burner does not require air and gas pressures above those used for traditional burners (500-700 daPa) as occurs for the flameless burners.

The injection of the air and the injection of the differentiated gas into three zones 22, 23, 24 and into two zones 22 and 24, respectively, the further dilution of the primary combustion in at least two sub-combustions, and the injection speed of the tertiary air and of the secondary gas creating a significant recirculation of the flue gases, permit the generation of a combustion with particularly diluted flame and with a particularly low production of NOx. Moreover, in specific circumstances, such as chamber temperature above 800° C. and combustion ratio where $\lambda<1.1$, the recirculation of the flue gases is such as to make the flame invisible and permit to enter in an operating range characteristic of flameless burners with a recirculating factor $Kv=[m_{exhausted}/(m_{combustible}+m_{comburent})]$ equal to about 4, where m is the flow rate.

The main advantage of the burner according to the present invention is given by the fact that the burner succeeds in operating with low NOx emissions from the moment of cold ignition up to the maximum temperature of use without requiring, when the chamber temperature is low, significant excess air to increase the flame stability as occurs for most burners which use the technique of staged combustion. The cold flame stability is ensured by the fact that the primary combustion almost operates in stoichiometric ratio.

The flame length varies according to the geometry and the angle and inclination of the holes 19 and 21; the more the holes 19 are angled and "swirled", the shorter the flame.

The ignitions of the burner are obtained with the electrode 16 i.e. with the pilot for which a dedicated hole 16' is made on the combustion head 13. The flame detection is provided with the UV cell or with the same ignition electrode 16 or with a further electrode. The UV cell is connected to the tube 12 and communicates with the flame through a dedicated hole 12' on the combustion head 13.

Figure 1:
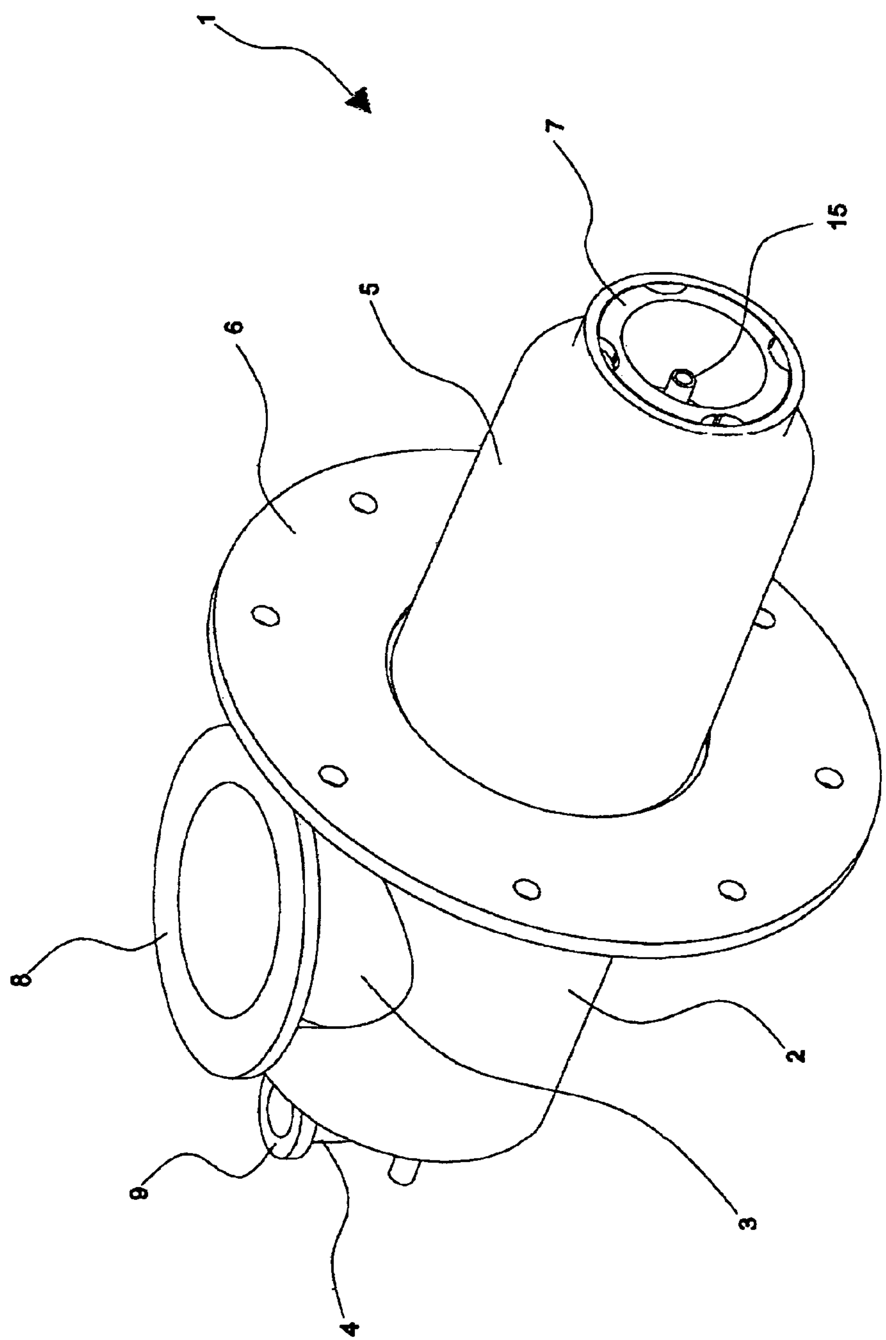
FIG. 1 shows a first perspective view of a burner according to the invention.
Figure 2:
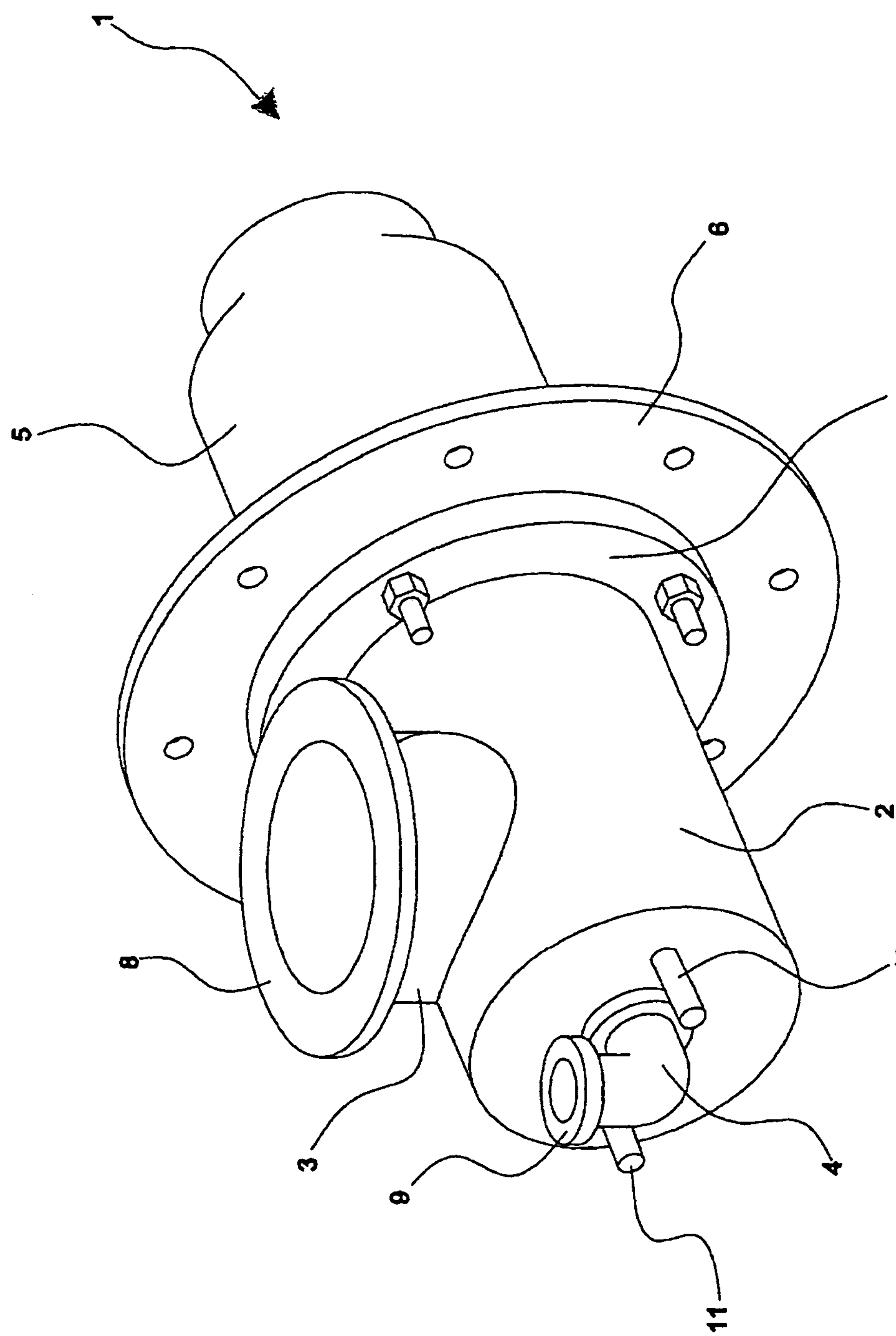
FIG. 2 shows a second perspective view of the burner in FIG. 1.
Figure 3:
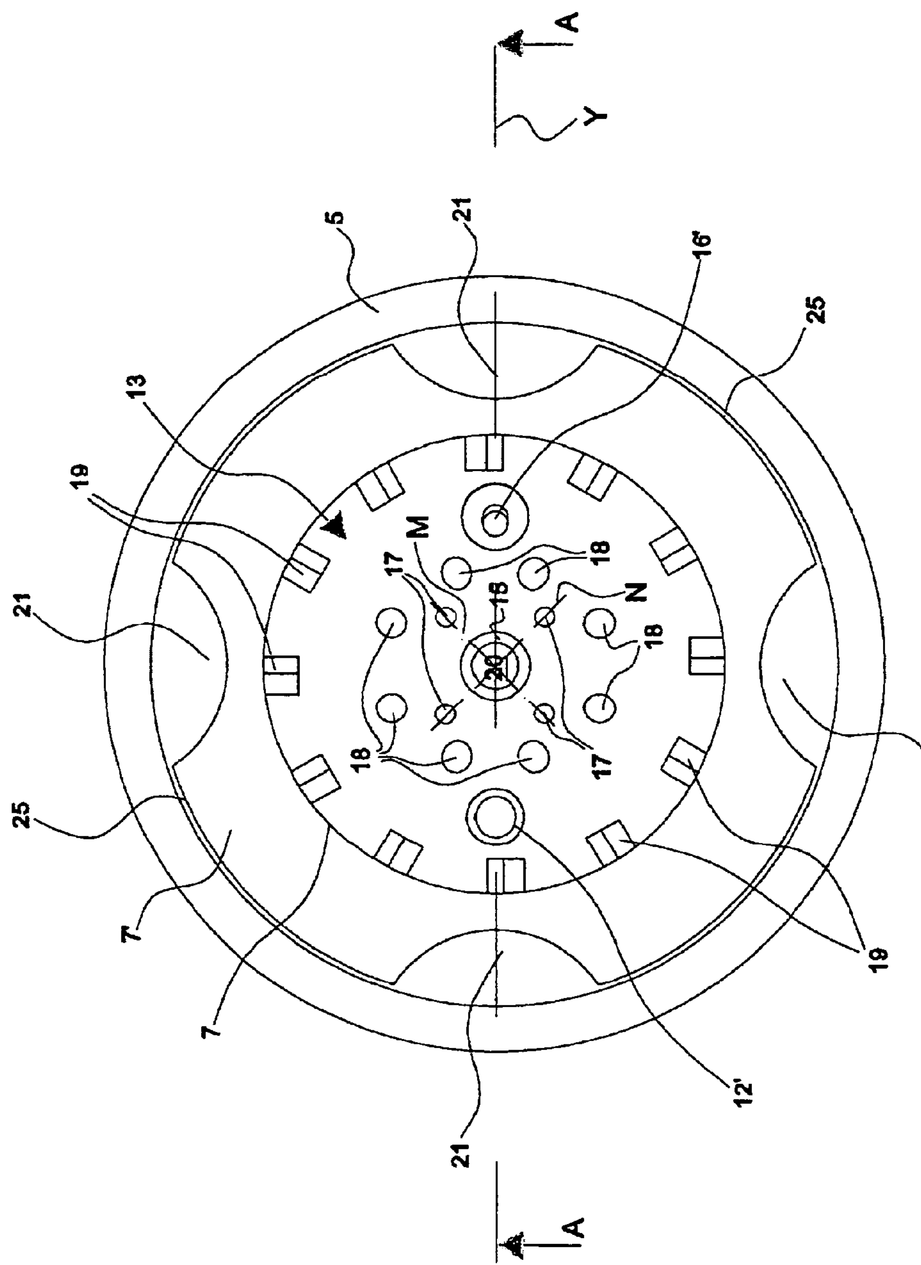
FIG. 3 shows a front view of an end of the burner in FIG. 1.

Indicated below are certain parameters of the combustion process, which ensure an effective combustion, and certain design data of the burner according to the present invention:

the average injection speed of the primary comburent air through the holes 18 may vary from 70 to 120 m/s with pre-heated air at 400° C., preferably from 100 to 120 m/s;

the average injection speed of the secondary comburent air through the holes 19 may vary from 70 to 120 m/s with pre-heated air at 400° C., preferably from 80 to 100 m/s;

the average injection speed of the tertiary comburent air through the holes 21 and the circular-crown-shaped passage 25 may vary from 70 to 120 m/s with pre-heated air at 400° C., preferably from 110 to 120 m/s;

the breakdown of the air in the various stages of combustion is: 5-40% for the primary air, 5-60% for the secondary air, 5-60% for the tertiary air, preferably the optimal breakdown is 15-20% for the primary air, 30-35% for the secondary air, 50-55% for the tertiary air;

the pressure of the comburent air inlet into the pipe 3 may vary from 45 to 70 mbar according to the injection speed of the air and to the geometries of the holes;

the average injection speed of the primary combustible gas through the holes 17 may vary from 60 to 110 m/s with gas at ambient temperature, preferably from 80 to 100 m/s;

the average injection speed of the secondary combustible gas through the tube 15, in the section of passage 20, may vary from 60 to 110 m/s with gas at ambient temperature, preferably from 90 to 110 m/s;

the combustion ratio $\lambda_1$ of the primary combustion or of the primary sub-combustions (generated by the output of primary air and by the rate of primary gas) may vary from 0.85 to 1.05;

the combustion ratio $\lambda_2$ of the secondary combustion (generated by the output of secondary air and by the rate of primary unburnt gas) may vary from 2.5 to 2.7, therefore air in excess;

the combustion ratio $\lambda_3$ of the tertiary combustion (generated by the output of tertiary air and by the rate of secondary gas) may vary from 0.55 to 0.7, therefore gas in excess;

the pressure of the combustible gas entering the pipe 4 may vary from 45 to 70 mbar according to the injection speed of the gas and to the geometries of the holes;

the holes 18 of the primary air, having circular section, may vary from 4 to 8;

the holes 19 of the secondary air, preferably having rectangular section, and obtained on the edge of the combustion head 13, may vary from 10 to 14, preferably in number of 12 as in FIG. 3;

the holes 21 of the tertiary air may vary from 2 to 4 and may have a circular or rectangular shape, or a shape of part of circular or semi-elliptical section if they are obtained on an edge of said annular protrusion 7' of the tubular element 7;

the holes 17 of the primary gas, having circular section, may vary from 2 to 4;

the tube 15 of the secondary gas has a variable length from 50 to 80 mm, preferably the length is from 60 to 70 mm. The ratio between the length of the tube 15 and the length of the tubular element 7 is equal to about ⅔;

the holes 18 are arranged in essence along a circumference having a diameter equal to about ⅔ of the outer diameter of the combustion head or diffuser 13;

- the holes 17 are arranged substantially along a circumference having a diameter equal to about ⅓ of the outer diameter of the combustion head 13;
- the holes 19 are arranged substantially along a circumference having diameter equal to the outer diameter of the combustion head 13;
- the holes 19 of the secondary air have a right-hand angle so as to obtain a swirled flow or swirling; preferably the swirl angle may be between 10° and 15° and the inclination with respect to the X axis of the burner is between 0° and 5°;
- the holes 21 are arranged in essence along a circumference having diameter equal to the outer diameter of the tubular element 7;
- the holes 21 of the tertiary air have an inclination with respect to the X axis of the burner which may be between −5° and 5°; preferably, the inclination is equal to 0° to obtain a lean and compact flame;
- the ratio between inner diameter of the tubular element 7 and the length of the tubular element is equal to about 1 to increase the recirculation of the burnt flue gases therewithin;
- the ratio between the outer diameter and inner diameter of the tubular element 7 can be between 1.2 and 1.4;
- the material of the tubular element 7 is preferably in silicon carbide or other material suitable for high temperature applications;
- the flame guide tube 5 has a section which decreases towards the final end so as to define the circular-crown-shaped passage 25 together with the outer profile of the tubular element 7;
- the material of the flame guide tube 5 is preferably in silicon carbide or other material suitable for high temperature applications;
- advantageously, the primary combustion, broken down into sub-combustions, occurs dilutedly within the tubular element 7 in the primary zone 22;
- advantageously, the secondary combustion occurs within the tubular element 7 in the secondary zone 23;
- advantageously, the tertiary combustion starts and is completed in a tertiary zone 24 outside the tubular element 7 and the flame guide tube 5 so as to easily recirculate the products of the previous combustions.

Figure 7:
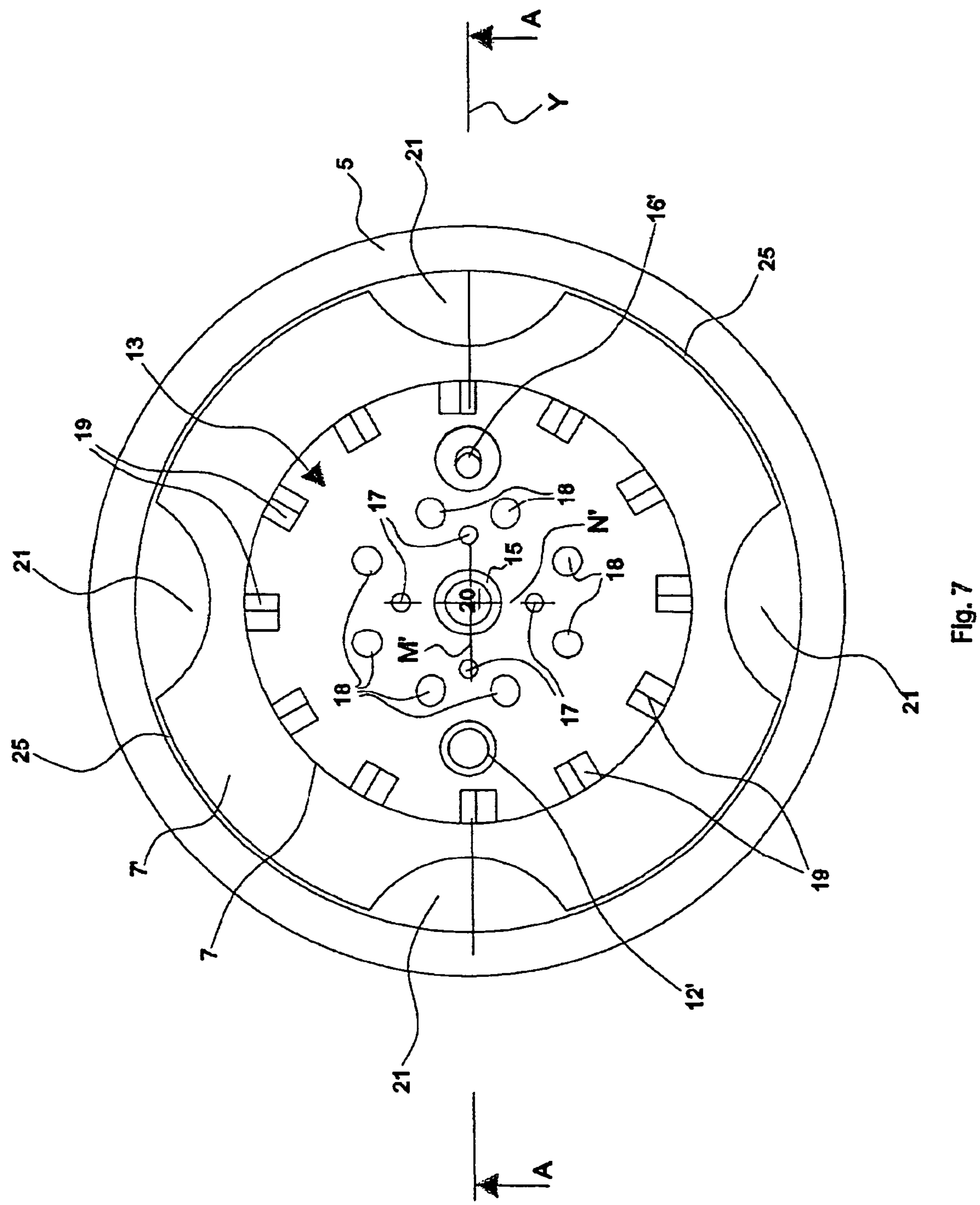
FIG. 7 shows a variant of the front view of the end of the burner in FIG. 1.
Figure 7A:
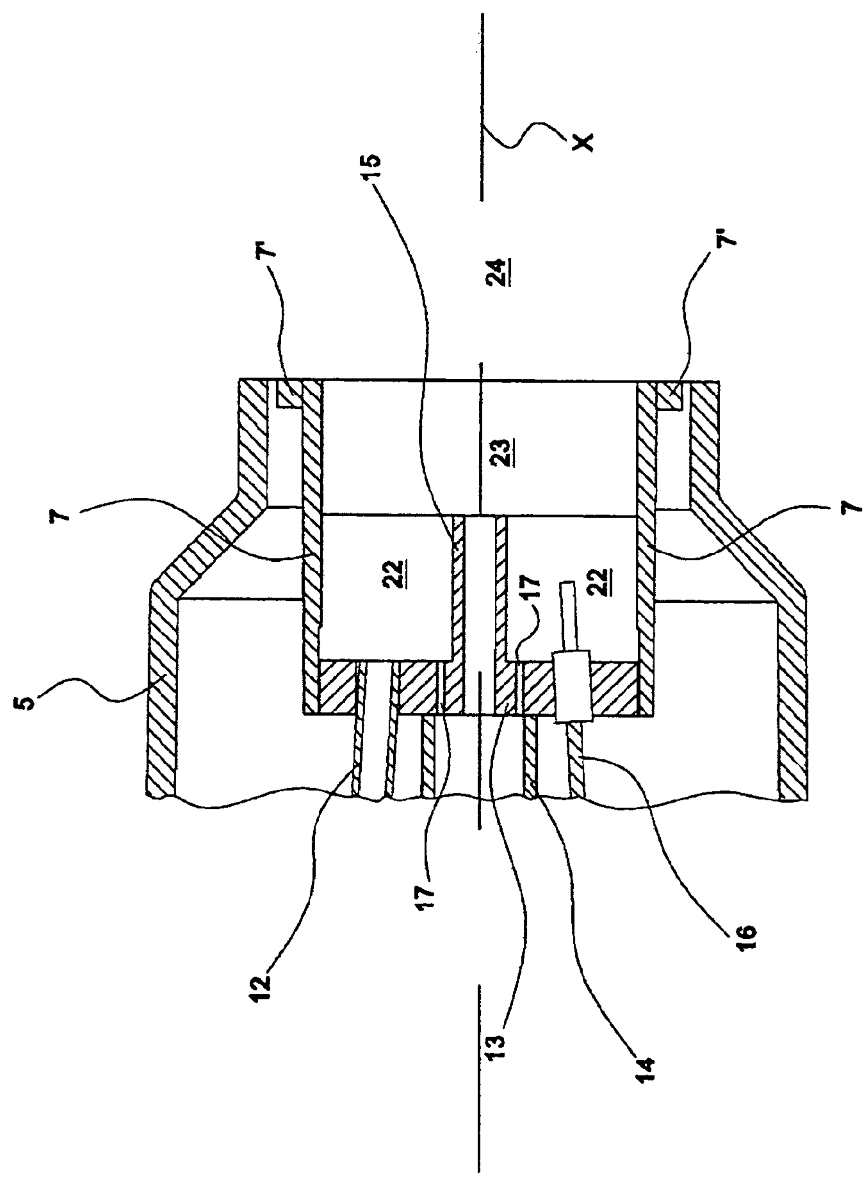
FIG. 7*a* shows a section along the path plane A-A of the burner in FIG. 7.
Figure 8:
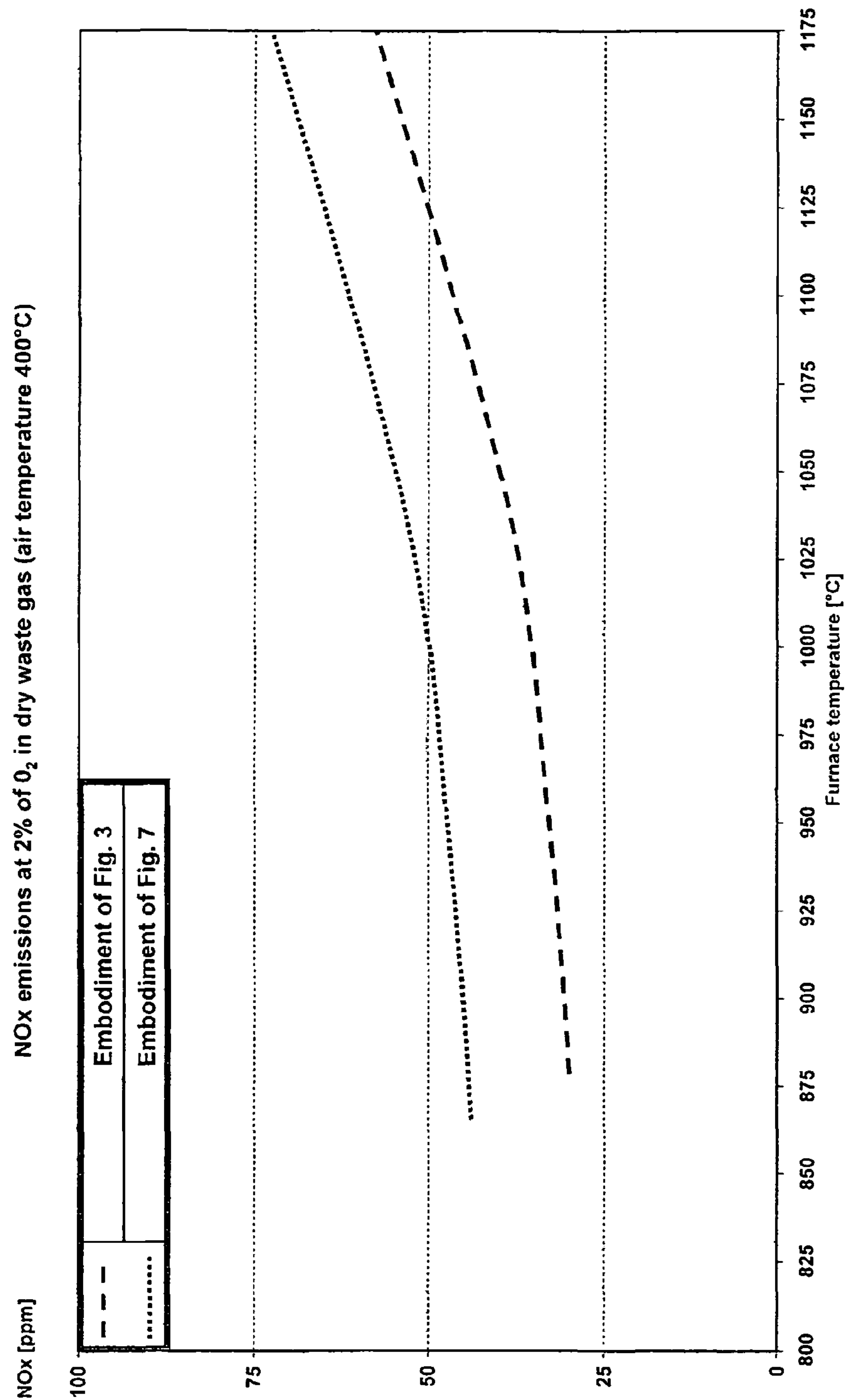
FIG. 8 shows a NOx emissions-temperature diagram in which the average emissions values are noted for the different configurations of the burner in FIG. 1.

With reference to the front views of the burner in FIG. 3 and FIG. 7, the inclination with respect to the X axis of the holes 18 for passing the primary air may vary between 10° and 30°, said holes 18 having their own converging axis with respect to the X axis of the burner. Preferably, half of the holes 18 has a different inclination with respect to the other half. The four holes 18 adjacent to the holes 16' and 12', which form the housing of the electrode and of the UV cell, respectively, have a preferred inclination of 25°, the remaining four holes 18 preferably have an inclination of 15°.

The inclination with respect to the X axis of the holes 17 of the primary gas may vary between 0° and −15°; preferably half of the holes 17 have a different inclination with respect to the other half. Preferably, half of the holes 17 have an inclination of 0°, i.e. they are parallel to the longitudinal X axis of the burner; the other half of the holes 17 have an inclination of −10°, i.e. they have their own axis diverging from said X axis. Even more preferably, the number of holes 17 is equal to four.

In the first variant of the diffuser 13, illustrated in FIG. 3, two holes 17 symmetrically opposite to each other with respect to the middle of the outlet section of the tube 15 have an inclination of 0° with respect to the X axis while the other two holes 17, opposite to each other with respect to the tube 15, have an inclination of −10° with respect to the X axis. The outlet sections of the holes 17 are preferably arranged, if considered in pairs, so as to define straight lines M, N which intersect, with a 45° angle, the imaginary line Y which unites the outlet sections of the holes 16' and 12'.

In the second variant of the diffuser 13, illustrated in FIG. 7, the four holes 17 are arranged in a position rotated by 45°, about the X axis, with respect to the position occupied thereby in FIG. 3. A first pair of holes 17, symmetrically opposite to each other with respect to the middle of the outlet section of the tube 15 generally coinciding with the X axis, has its axes parallel to the X axis. The outlet sections of the holes 17 are arranged in two pairs, said first pair of which preferably defines the straight line M', in essence parallel to the imaginary Y line which unites the outlet sections of the holes 16' and 12'. The outlet sections of the second pair of holes 17 are arranged with respect to the X axis of the burner so as to define a second straight line N' which intersects the axis of the tube 15 and forms substantially a 90° angle with the imaginary line Y which unites the outlet sections of the holes 16' and 12', or vice versa. The longitudinal axes of the second pair of holes 17 have their own axis inclined by −10° with respect to the X axis, in the direction of a divergence with respect to the axis of the tube 15.

Advantageously, the way in which the inclinations of the holes 17 and 18 are chosen with respect to the X axis and the arrangement of the holes 17 of the primary gas with respect to the Y line generate a series of primary sub-combustions between two and four.

In the first preferred variant in FIG. 3, the primary air exiting from the holes 18 inclined at 25° with respect to the X axis is mixed with the primary gas exiting from the holes 17 inclined at −10° in an area within the primary zone 22 at a distance from the combustion head 13 equal to about ⅓ of the length of the tube 15; the primary air exiting from the holes 18 inclined at 25° is mixed with the primary gas exiting from the holes 17 inclined at 0° in an area within the primary zone 22 and at a distance from the combustion head 13 equal to about ⅖ of the length of the tube 15; the primary air exiting from the holes 18 inclined at 15° is mixed with the primary gas exiting from the holes 17 inclined at −10° in an area within the primary zone 22 and at a distance from the combustion head 13 equal to about ⅗ of the length of the tube 15; the primary air exiting from the holes 18 inclined at 15° is mixed with the primary gas exiting from the holes 17 inclined at 0° in an area at the edge of the primary zone 22, at a distance from the combustion head 13 equal to about the length of the tube 15. Thus, with this first variant the result is four primary sub-combustions.

In the second preferred variant in FIG. 7, the primary air exiting from the holes 18 inclined at 25° is mixed with the primary gas exiting from the holes 17 inclined at 0° in an area within the primary zone 22 and at a distance from the combustion head 13 equal to about ⅖ of the length of the tube 15; the primary air exiting from the holes 18 inclined at 15° is mixed with the primary gas exiting from the holes 17 inclined at −10° in an area within the primary zone 22 and at a distance from the combustion head 13 equal to about ⅗ of the tube 15 length. Thus, with this second variant the result is two primary sub-combustions further back towards the combustion head with respect to the variant in FIG. 3.

FIG. 9 shows the average values of the NOx emissions of the burner obtained by the two variants in FIG. 3 and FIG. 7, both suitable for operating in heat treatments in which a furnace temperature is required about the temperature of spontaneous ignition of the fuel:

with the first variant in FIG. 3, the four primary sub-combustions determine a good cold stability, an average hot stability and good NOx emissions;

with the second variant in FIG. 7, the two primary sub-combustions determine a good cold stability, a good hot stability and average NOx emissions.

The process according to the invention allows the polluting emissions to be minimized in any operating range, both in terms of burner power, and of operating temperature of the furnace, and of temperature of the comburent air, and of excess oxygen in the chamber, etc.

Processing means and process control integrated with the above-described burner may be provided to execute the process according to the invention. Said burner, having high flexibility under any condition of usage, advantageously has low costs to make, is characterized by particularly low emission levels from the first instant of operation thereof thus permitting particularly interesting industrial results in all the operating ranges of a typical heat treatment furnace. Thus, the burner of the invention also ensures low emissions when the operating temperatures in the furnace oscillate for a certain period in proximity of the temperature of spontaneous ignition of the combustible gas.

The specific embodiment methods described here do not restrict the contents of this application which covers all the variants of the invention defined in the claims.

The invention claimed is:

1. A low NOx emission industrial burner comprising:

a hollow body defining a longitudinal axis;

a tubular element arranged within said hollow body at one open end thereof;

a diffuser arranged within said tubular element at a first end thereof inside the hollow body, so as to define a volume within said hollow body;

a pipe for feeding comburent air into said volume;

a combustible gas injection lance, arranged within said hollow body and connected to said diffuser;

wherein said diffuser is provided with:

first holes for injecting a first portion of combustible gas from said injection lance, into a first combustion zone provided within said tubular element and adjacent to said diffuser;

second holes for injecting a first portion of comburent air into said first combustion zone;

third holes for injecting a second portion of comburent air into a second combustion zone, provided within said tubular element, downstream of the first combustion zone and communicating with the latter, said second portion of comburent air crossing said first combustion zone;

a tube for injecting a second portion of combustible gas, from said injection lance, into a third combustion zone outside said tubular element, provided downstream of the second combustion zone and communicating with the latter, said second portion of combustible gas crossing said second combustion zone;

the burner being further provided with a longitudinal passage, defined between the outer profile of said tubular element and the inner profile of said open end of the hollow body for injecting a third portion of comburent air into said third combustion zone, and wherein part of the second holes has a different inclination with respect to the remaining part of said second holes for injecting the first portion of comburent air into at least two primary combustion sub-zones within the same first combustion zone.

2. A burner according to claim 1, wherein said longitudinal passage has a circular-crown-shaped cross section.

3. A burner according to claim 1 wherein, at a second end thereof, said tubular element is provided with an annular protrusion which occupies part of said longitudinal passage, said annular protrusion being provided with fourth holes for injecting part of said third portion of comburent air.

4. A burner according to claim 3, wherein said fourth holes are substantially arranged along a circumference with the same diameter as the tubular element and are inclined with respect to the longitudinal axis by from −5° to 5°.

5. A burner according to claim 1, wherein part of the first holes have a different inclination with respect to the remaining part of said first holes for injecting a first portion of combustible gas into at least two primary combustion sub-zones within the same first combustion zone.

6. A burner according to claim 5, wherein the second holes are substantially arranged along a circumference having a diameter of about ⅔ of the outer diameter of the diffuser and are inclined with respect to the longitudinal axis by from 10° to 30°, said second holes being converging with respect to said axis; and wherein the first holes are substantially arranged along a circumference having a diameter of about ⅓ of the outer diameter of the diffuser and are inclined with respect to the longitudinal axis by an angle of 0° to −15°.

7. A burner according to claim 1, wherein a ratio of the length to the inner diameter of the tubular element comprises the values in the range from 0.95 to 1.05.

8. A burner according to claim 1, wherein the third holes are substantially arranged along a circumference having the same diameter as the diffuser and have a right-hand angle so as to obtain a vertical flow.

9. A burner according to claim 8, wherein said third holes have a swirl angle from 10° to 15° and an inclination with respect to the longitudinal axis from 0° to 5°.

10. A low NOx emission combustion process, implementable by means of a burner and a furnace with which said burner cooperates defining a combustion chamber, the process comprising the steps of:

providing a burner comprising:

a hollow body defining a longitudinal axis, a tubular element arranged within said hollow body at one open end thereof;

a diffuser arranged within said tubular element at a first end thereof inside the hollow body, so as to define a volume within said hollow body;

a pipe for feeding comburent air into said volume;

a combustible gas injection lance (14), arranged within said hollow body and connected to said diffuser;

wherein said diffuser is provided with first holes for injecting a first portion of combustible gas from said injection lance, into a first combustion zone provided within said tubular element and adjacent to said diffuser;

second holes for injecting a first portion of comburent air into said first combustion zone;

third holes for injecting a second portion of comburent air into a second combustion zone, provided within said tubular element, downstream of the first combustion zone and communicating with the latter, said second portion of comburent air crossing said first combustion zone;

a tube for injecting a second portion of combustible gas, from said injection lance, into a third combustion zone outside said tubular element, provided downstream of the second combustion zone and communicating with the latter, said second portion of combustible gas crossing said second combustion zone;

the burner being further provided with a longitudinal passage, defined between the outer profile of said tubular element and the inner profile of said open end of the hollow body for injecting a third portion of comburent air into said third combustion zone, and wherein part of the second holes has a different inclination with respect to the remaining part of said second holes for injecting the first portion of comburent air into at least two primary combustion subzones within the same first combustion zone;

a primary combustion step which occurs by mixing, in the first combustion zone, a first portion of comburent air injected through the second holes with a first portion of combustible gas injected through the first holes into a first, substantially stoichiometric air/fuel ratio, thus obtaining primary combustion products and primary unburnt gas;

a secondary combustion step which occurs by mixing, in the second combustion zone, a second portion of comburent air injected through the third holes with said primary combustion products and said primary unburnt gas with air in excess, so as to obtain a second super-stoichiometric air/fuel ratio, thus obtaining secondary combustion products and secondary unburnt air;

a tertiary combustion step which occurs by mixing, in the third combustion zone, a second portion of combustible gas injected through the tube with a third portion of comburent air injected through the longitudinal passage, with said primary and secondary combustion products and said secondary unburnt air with gas in excess, so as to obtain a third sub-stoichiometric air/fuel ratio, so as to complete the total combustion within the combustion chamber of the furnace.

11. A process according to claim 10, wherein the primary combustion comprises from two to four primary sub-combustions, the root of each primary sub-combustion being at a distance from the diffuser which is different from the other primary sub-combustions.

12. A process according to claim 11, wherein said primary sub-combustions have the same, substantially stoichiometric combustion ratio.

13. A process according to claim 10, wherein the first air/fuel ratio of the primary combustion or of the primary sub-combustions may vary from 0.85 to 1.05; the second air/fuel ratio of the secondary combustion may vary from 2.5 to 2.7; the third air/fuel ratio of the tertiary combustion may vary from 0.55 to 0.7.

14. A process according to claim 10, wherein an average injection rate of the first portion of comburent air may vary from 70 to 120 m/s with pre-heated air at 400° C., and wherein an average injection rate of the second combustible gas portion may vary from 60 to 110 m/s with gas at ambient temperature.

* * * * *